United States Patent
Ahlers et al.

(10) Patent No.: US 9,346,399 B2
(45) Date of Patent: May 24, 2016

(54) METHOD AND DEVICE FOR SETTING PARAMETERS OF A PLURALITY OF LIGHT SOURCES AND AUDIO SOURCES

(75) Inventors: Julia Ahlers, Berlin (DE); Imke Gaus, Berlin (DE); Stefanie Wald, Berlin (DE); Oliver Hengstenberg, Berlin (DE); Jian Lou, Berlin (DE); Thorb Baumgarten, Berlin (DE); Frank Althoff, Lehrte (DE); Werner Hamberger, Lenting (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 258 days.

(21) Appl. No.: 13/581,783

(22) PCT Filed: Feb. 28, 2011

(86) PCT No.: PCT/EP2011/000962
§ 371 (c)(1),
(2), (4) Date: Oct. 25, 2012

(87) PCT Pub. No.: WO2011/113528
PCT Pub. Date: Sep. 22, 2011

(65) Prior Publication Data
US 2013/0046443 A1    Feb. 21, 2013

(30) Foreign Application Priority Data
Mar. 13, 2010    (DE) ......................... 10 2010 011 306

(51) Int. Cl.
*B60Q 3/02*    (2006.01)
*B60Q 3/04*    (2006.01)
*B60K 37/06*    (2006.01)
*B60K 35/00*    (2006.01)

(52) U.S. Cl.
CPC .............. *B60Q 3/0293* (2013.01); *B60K 35/00* (2013.01); *B60K 37/06* (2013.01); *B60Q 3/048* (2013.01); *B60K 2350/1004* (2013.01); *B60K 2350/1028* (2013.01)

(58) Field of Classification Search
CPC ..... B60R 16/037; B60Q 3/0293; B60Q 3/048
USPC ......................................................... 701/48
See application file for complete search history.

(56) References Cited

U.S. PATENT DOCUMENTS

| | | | |
|---|---|---|---|
| 7,050,795 B2 * | 5/2006 | Wiegand et al. | 455/419 |
| 7,170,400 B2 * | 1/2007 | Cowelchuk et al. | 340/438 |
| 7,362,217 B2 * | 4/2008 | Woo | 340/442 |

(Continued)

FOREIGN PATENT DOCUMENTS

| | | |
|---|---|---|
| WO | 2008050136 A1 | 5/2008 |
| WO | 2009012034 A1 | 1/2009 |

OTHER PUBLICATIONS

Search Report for International Patent Application No. PCT/EP2011/000962; May 19, 2011.

*Primary Examiner* — Todd Melton
(74) *Attorney, Agent, or Firm* — Barnes & Thornburg LLP

(57) ABSTRACT

A method and device for setting at least one parameter of at least one light source, wherein the light source is disposed in a vehicle, wherein the at least one parameter of the at least one light source and at least one parameter of at least one audio source are set by means of activation of a first functional profile, wherein the at least one audio source is disposed in the vehicle.

17 Claims, 1 Drawing Sheet

(56) References Cited

U.S. PATENT DOCUMENTS

| | | | |
|---|---|---|---|
| 7,860,621 B2 * | 12/2010 | Decke et al. | 701/36 |
| 7,957,864 B2 * | 6/2011 | Lenneman et al. | 701/36 |
| 7,978,056 B2 * | 7/2011 | Mercurio et al. | 340/438 |
| 8,140,344 B2 * | 3/2012 | Kameyama | 705/7.29 |
| 8,239,087 B2 * | 8/2012 | Dybalski et al. | 701/29.1 |
| 8,706,349 B2 * | 4/2014 | Rector et al. | 701/36 |
| 2005/0261815 A1 | 11/2005 | Cowelchuk et al. | |
| 2005/0280524 A1 * | 12/2005 | Boone et al. | 340/461 |
| 2007/0130591 A1 * | 6/2007 | Brady, Jr. | H04L 29/06 725/76 |
| 2008/0024285 A1 | 1/2008 | Vandenbrink et al. | |
| 2008/0147270 A1 * | 6/2008 | Sakane et al. | 701/36 |
| 2008/0211779 A1 | 9/2008 | Pryor | |

\* cited by examiner

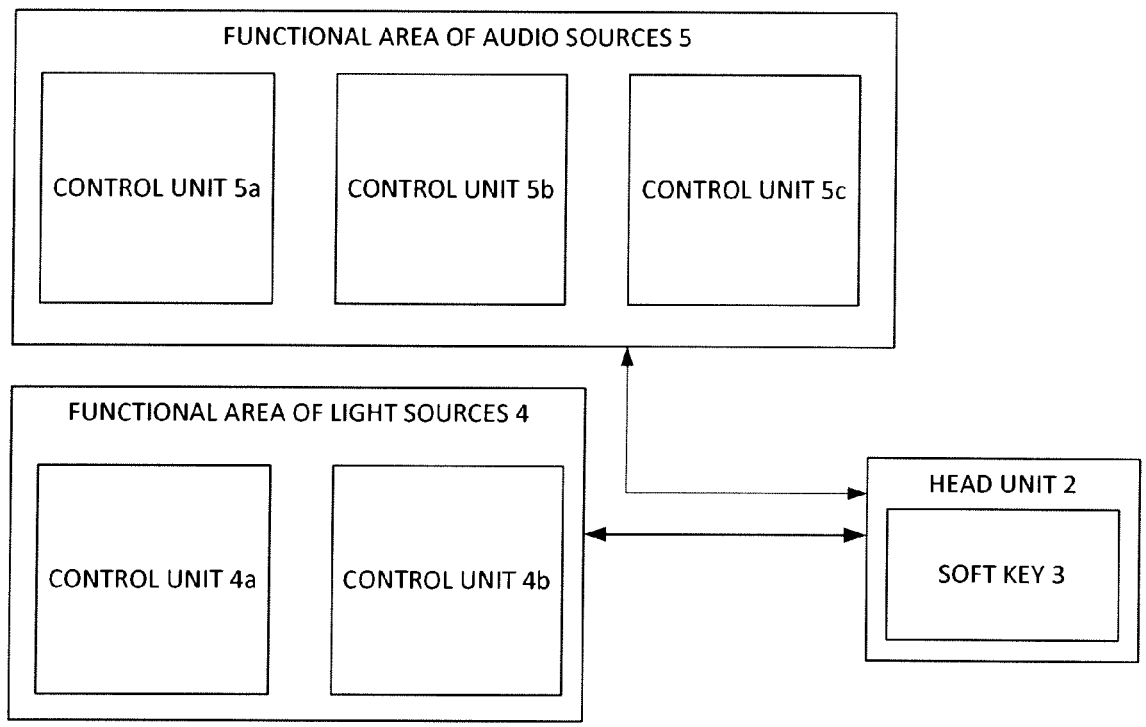

METHOD AND DEVICE FOR SETTING PARAMETERS OF A PLURALITY OF LIGHT SOURCES AND AUDIO SOURCES

PRIORITY CLAIM

This patent application is a U.S. National Phase of International Patent Application No. PCT/EP2011/000962, filed 28 Feb. 2011, which claims priority to German Patent Application No. 10 2010 011 306.9, filed 13 Mar. 2010, the disclosures of which are incorporated herein by reference in their entirety.

FIELD

Disclosed embodiments relate to a method and a device for setting at least one parameter of at least one light source, wherein the light source is arranged in a vehicle.

BACKGROUND

In modern vehicles, in particular in motor vehicles, manifold various light sources exist, e.g., light sources in the vehicle roof lining and light sources for dashboard lighting. These light sources can be assigned to a functional area of light sources of the vehicle. A mode of operation of the light sources can be changed by means of a setting of one or more parameters of the respective light source, e.g., a luminosity. By adapting the luminosity of a light source to a vehicle driver, for example, safety during operation of the vehicle can be increased.

Furthermore, manifold audio sources exist in modern motor vehicles, e.g., audio sources of a driver assistance system, audio sources of a driver information system, and audio sources of an infotainment system. These audio sources may be assigned to a functional area of audio sources of the vehicle. A mode of operation of the audio sources can be changed by means of a setting of one or more parameters of the respective audio source, e.g., a volume. By adapting the volume of an audio source to a vehicle driver, for example, safety during operation of the vehicle can be increased.

An adaptation of parameters of the light sources and audio sources may be necessary in particular when sleeping children are transported in the automobile. Tired children also require increased attentiveness of the vehicle driver. Tired children in the vehicle can, therefore, distract the vehicle driver from his driving task. It may be, therefore, desirable not to wake sleeping children by excessively strong illumination or excessively loud sound. Individual setting of all parameters of all light sources and audio sources, e.g., before beginning driving or during the travel of the vehicle, by the vehicle driver may be typically very time-consuming.

Approaches for simultaneously setting parameters of multiple vehicle functions, which can also be assigned to various functional areas, exist in the field of vehicle operation. Such an approach may be a so-called user-specific setting. A user-specific setting means in this case that multiple parameters are set as a function of a user, for example, a vehicle driver.

For example, WO 2008/050136 discloses a vehicle system for use in a vehicle, wherein the vehicle system can store information on the vehicle use. Furthermore, the vehicle system can store vehicle options for a vehicle driver. Furthermore, the publication discloses that a vehicle driver can be identified, and vehicle-driver-specific data can be loaded and displayed. In this case, parameters are, thus, loaded and displayed in a user-specific or personalized manner.

Approaches also exist for a group-specific setting of parameters. A group-specific setting of parameters means in this case that parameters can be set as a function of a group of users, e.g., vehicle drivers. In this case parameters are, thus, not set in a personalized or user-specific manner, but rather are adapted to, e.g., requirements of a user group, i.e., multiple users.

Above-mentioned WO 2008/050136 discloses in this regard that a vehicle driver can select a predetermined group of parameters. E.g., the vehicle driver can select a group of parameters which are adapted to vehicle drivers having poor hearing ability or color blindness. A display unit can then display information to the vehicle driver in accordance with the set parameters.

US 2008/0211779 A1 discloses a method for controlling a system. The method comprises the provision of a display unit, which may be controlled by means of a computer. The display unit allows an input of data in this case. The display unit can be reconfigured in this case. Furthermore, the publication discloses that a configuration of the display unit can be made, e.g., dependent on user groups, e.g., retirees, students, families, or senior citizens.

SUMMARY

However, a group-specific setting of parameters is only disclosed conventionally for one functional area of the vehicle, in particular for a display unit, in both above-explained publications. As a result, the technical problem presents itself of providing an improved, in particular more rapid and comfortable setting of parameters of light sources and audio sources of a vehicle.

Accordingly, a method is proposed for setting at least one parameter of at least one light source, wherein the light source may be arranged in a vehicle. Light sources may comprise in this case, e.g., light sources in the vehicle roof lining, light sources for dashboard lighting, light sources for foot well lighting, light sources for baggage compartment lighting, and further light sources in the vehicle. All light sources may be assigned to a functional area of light sources of the vehicle in this case. The control of a light source can be designated in this case as a vehicle function which may be assigned to the functional area of light sources. Parameters of the light sources can be, e.g., a luminosity, in particular in the case of dimmable light sources. A parameter of a light source can also be a duration until the light source reaches a desired luminosity (dimming speed). A parameter of a light source can also be a flashing frequency of the light source (on-off frequency). A parameter of a light source can also be a color of the light source. Parameters can be set, e.g., in a continuous or discrete value range.

The term "parameter" also may comprise states of one of the light sources which characterize a specific mode of operation of this function, however. For example, the term "parameter" can also designate states such as "on" or "off".

BRIEF DESCRIPTION OF FIGURES

Utility of the disclosed embodiments will be explained in greater detail on the basis of an exemplary embodiment illustrated in the Figures wherein:

FIG. 1 is a schematic block diagram of a device for setting at least one parameter of a light source and at least one parameter of an audio source.

DETAILED DESCRIPTION OF DISCLOSED EMBODIMENTS

The at least one parameter of the at least one light source may be set by means of activation of a first function profile, the so-called baby sleep profile. An operating element in the vehicle can be used for the activation, for example.

According to disclosed embodiments, upon the activation of the baby sleep profile, at least one parameter of at least one audio source may be additionally set, wherein the at least one audio source may be not assigned to the functional area of light sources, but rather to a functional area of audio sources of the vehicle. The at least one audio source may be arranged in the vehicle in this case. Audio sources comprise in this case, e.g., audio sources of a driver assistance system, audio sources of a driver information system, and audio sources of an infotainment system, and further audio sources in the vehicle. All audio sources may be assigned in this case to a functional area of audio sources of the vehicle. The control of an audio source can also be designated in this case as a vehicle function, wherein this vehicle function may be assigned to the functional area of audio sources. Parameters of the audio sources can be, e.g., a volume. A parameter of an audio source can also be a duration until the audio source reaches a desired volume. A parameter of an audio source can also be a fading ratio, e.g., between volume in the front vehicle region and volume in the rear vehicle region. A parameter of an audio source can also be the proportion of treble and bass in the audio signal.

In this case, only parameters of parameterizable light and/or audio sources can be set by means of an activation. It can, thus, be ensured, for example, that light and/or audio sources can exist, whose parameters are not to be changed by an activation of the baby sleep profile. These parameterizable light sources and the parameterizable audio sources, whose parameters may be set by means of the activation of the baby sleep profile, may be assignable in this case to the functional areas of light sources and audio sources in the vehicle. However, parameterizable light and/or audio sources, which are not assigned to the functional area of light sources or audio sources, can also exist. Parameters of these parameterizable light and/or audio sources then cannot be set by means of an activation of a group-specific function profile.

Parameterizable light and/or audio sources can each comprise one or more parameters in this case, which may be set upon an activation. The parameterizable light and/or audio sources can also comprise changeable parameters and unchangeable parameters, wherein only the changeable parameters can be set in the event of an activation.

Of course, by means of the activation of the baby sleep profile, parameters of further parameterizable vehicle functions of still further functional areas can be set. Functional areas comprise in this case, e.g., access control and driving authorization, window and roof control, mirror, seat, and steering wheel adjustments, climate control and heating systems, driver information and operation, infotainment and communication, driver assistance systems, occupant and passenger protection, chassis, car2X functions, drivetrain, special vehicle systems, networking/diagnostic functions, wiping and washing systems, and signal and power distribution. The embodiments for setting parameters of parameterizable light and/or audio sources can be transferred to the setting of parameters of further parameterizable vehicle functions of further functional areas.

The baby sleep profile may be understood in this case as a stored set of parameters which may be used for the purpose of setting at least one light source and at least one audio source in one operating step in such a manner that the vehicle may be adapted or optimized in particular for the case of transport of sleeping children.

In addition to the first function profile "baby sleep profile", still further activatable function profiles can also exist. In general, these function profiles may be used for the purpose of setting vehicle functions from different functional areas of the vehicle, in particular from the functional area of light sources and the functional area of audio sources, easily and intuitively, in order to adapt the vehicle to a desired driving situation, an environment, or a driver command. Requirements of the desired driving situation, the environment, or the driver command can be analyzed beforehand for this purpose and parameters can be determined from this analysis.

In particular, so-called group-specific function profiles, for example, the profiles business trip, family, accessibility, and student can also exist. In general, these group-specific function profiles may be used for the purpose of setting vehicle functions from different functional areas of the vehicle, in particular from the functional area of light sources and the functional area of audio sources, easily and intuitively, in order to adapt the vehicle not to an individual user, but rather a user of a specific user group. For this purpose, properties or requirements of the individual user group can be analyzed and parameters to be set can be derived therefrom. The vehicle may be, thus, usable easily for users of different user groups.

An activation of the baby sleep profile can be performed in this case when the vehicle may be traveling and also when the vehicle may be stationary. It may be also conceivable to only permit an activation under specific conditions. Such conditions can be, for example, an activated parking brake or a permissible velocity, which may be less than a predetermined maximum velocity, for example.

The setting of the parameters can be performed in this case in various ways. For example, an existing bus system, for example, a CAN bus, of the vehicle can be used. It may be also conceivable that control units, which control the light sources or audio sources, may be activated directly.

During an activation, e.g., a set of profile-specific parameters can be read out, e.g., from a memory unit provided in the vehicle, and these parameters can be transmitted using data technology to the control units of the vehicle, wherein the control units regulate the luminosity of a light source or the volume of an audio source, for example. The parameters may be then received and stored by the control units using data technology. For example, previously stored parameters can be overwritten in this case.

The activation of the baby sleep profile automatically ends an activity of a further, already activated function profile.

Furthermore, the vehicle driver and/or further vehicle occupants can be informed about an activated baby sleep profile. A display unit arranged in the vehicle can be used for this purpose, for example. Ambient functions, e.g., lighting and display properties of the display unit, can also be used for information about the currently activated function profile. Furthermore, for feedback about an activation of the baby sleep profile, specific vehicle functions, in particular vehicle functions in the functional area of lighting and/or in the functional area of infotainment, can be displayed in exaggerated form directly after an activation of a function profile.

The method can carry out a changeover to the baby sleep profile function profile in a reasonable time in this case. A changeover in this case means an activation of the baby sleep profile when a further function profile has been activated. A reasonable time may be to be determined by a person skilled in the art in this case depending, e.g., on the function profile activated before the time of the activation and/or on the vehicle type.

Through the proposed method, a plurality of parameters of light sources and audio sources can advantageously be set simultaneously, i.e., in one operating step. The setting can be performed in this case in particular via a haptic operating element, for example, a button. A user can then advantageously set parameters of a plurality of parameters of light sources and audio sources via a button press on this button.

In particular, parameters of further vehicle functions of further functional areas of the vehicle can also be set simultaneously. The configuration of the baby sleep profile, i.e., the standard setting of all parameters, can be performed by the producer, for example, i.e., at the factory.

It may be also conceivable in this case that function profiles can also be activated as a function of a specific driving situation. For example, the baby sleep profile can be automatically activated in the event of detected night travel. The mode of operation of vehicle functions may, thus, also advantageously be adapted to a driving situation.

In a further embodiment, the baby sleep profile may be activated by means of an operating element. The operating element can be, for example, a touchscreen, a microphone having connected speech recognition, or a haptic operating element, e.g., a switch, rotary knob, or pushbutton. The operating element may be preferably a soft key on a so-called head unit, which may be arranged in the vehicle. This advantageously has the result that the activation can be performed simply and/or the operating element can be integrated in an existing operating system of the vehicle.

In a further embodiment, the baby sleep profile may be selected from at least two function profiles. A selection can be performed from the above-mentioned function profiles, in particular the group-specific function profiles. A selection can be performed in this case by means of an actuation of a selection element, for example. A selection element can be, for example, a touchscreen, a microphone having connected speech recognition, or a haptic operating element, e.g., a switch, rotary knob, or pushbutton. Of course, further selection elements may be also conceivable. This advantageously has the result that a vehicle may be usable for multiple driving situations or user groups, wherein driving safety may be increased, for example, by selection and activation of an appropriate function profile because of better adaptation of the parameters to a driving situation or to the user.

The operating element and the selection element can be implemented as combined in this case, for example. A combination advantageously has the result that selection and activation can be performed, e.g., by the vehicle driver, intuitively and in few operating steps.

In a further embodiment, in the event of an activation of the baby sleep profile, all parameters of all parameterizable light sources may be set which may be assigned to the functional area of light sources. Simultaneously, all parameters of all parameterizable audio sources may be set, which may be assigned to the functional area of audio sources. This advantageously has the result that all changeable parameters can be set simultaneously. In an alternative embodiment, only predetermined parameters of the light sources and the audio sources may be set. This advantageously has the result that not all, but rather only selected parameters may be set, which requires less computing effort, transmission capacity, and memory space.

In a further embodiment, after activation of the baby sleep profile, at least one parameter of at least one light source and/or at least one parameter of at least one audio source may be settable in a user-specific manner. A user-specific setting of a parameter may be understood in this case to mean that one or more parameters may be set intentionally and individually by a user, e.g., a vehicle driver. The capability, thus, exists of changing individual parameters of the light sources and/or audio sources in a user-specific manner when a baby sleep profile may be activated, while remaining light sources and/or audio sources may be controlled using the parameters specified by the baby sleep profile.

For the user-specific setting of parameters, a second operating path for the setting of parameters of light sources and/or audio sources can be provided in the baby sleep profile. It can optionally be made more complicated than solely selecting and activating the baby sleep profile.

Furthermore, in the baby sleep profile, after activation of the baby sleep profile, a user-specific change of one or more parameters of one or more selected light sources and/or audio sources can be non-permissible. In this case, e.g., a change of selected parameters in the baby sleep profile can be blocked. For example, the baby sleep profile can comprise a number of user-specific changeable parameters and a number of non-user-specific changeable parameters.

Through the possibility of a user-specific setting of parameters, even with activated baby sleep profile, it may be advantageously made possible that light and/or audio sources can be adapted to a user, in particular a vehicle driver. This can increase the driving safety, for example.

In a further embodiment, the baby sleep profile may be configurable. The baby sleep profile can be configurable by a user, in particular the vehicle driver, in this case. Furthermore, all or only selected parameters in the baby sleep profile can be configurable. This advantageously has the result that a user can change the baby sleep profile.

The configuration of the baby sleep profile does not mean the preparation of a user-specific baby sleep profile in this case. Thus, e.g., a baby sleep profile can be reconfigured from an original baby sleep profile into a reconfigured baby sleep profile. If a further function profile may be activated and thereafter the baby sleep profile may be activated in turn, the original baby sleep profile may be, thus, no longer activated, but rather the reconfigured baby sleep profile.

In contrast thereto, if the baby sleep profile may be changed from an original baby sleep profile by means of a user-specific setting of a parameter into a changed baby sleep profile, thereafter a further function profile and then in turn the baby sleep profile may be activated, the original baby sleep profile may be again activated and not the changed baby sleep profile.

The vehicle can have, for example, a display unit, wherein an overview of the characteristics used in the baby sleep profile of the parameters of the light sources and/or audio sources may be made possible in a configuration view of the display unit.

A configuration of the baby sleep profile can be performed in this case, for example, via one or more configuration elements, which may be arranged in the vehicle. The configuration element can be a haptic or graphic interface. Alternatively or cumulatively, a configuration of the baby sleep profile can be performed externally, e.g., by means of a computer.

Furthermore, a starting state of the baby sleep profile can be set in a reset function. This advantageously has the result that the baby sleep profile can be reset to its starting values.

In this case, a setting of at least one parameter of the at least one light source and the at least one audio source can be intrinsically safe. The baby sleep profile configured by a user and/or the parameters of the baby sleep profile changed in a user-specific manner by the user can also be intrinsically safe. The term "intrinsically safe" may be understood in this case to mean that the setting of parameters can only be performed when the vehicle may be in a safe operating state and/or the setting of the parameters does not result in an unsafe operating state. For this purpose, e.g., at least one monitoring unit can be arranged in the vehicle, wherein the monitoring unit executes a monitoring function. The monitoring unit monitors a setting of parameters in this case. For example, the monitoring unit can check whether a parameter may be within a predetermined interval of the parameter. If the parameter may be outside the predetermined interval, the parameter is, thus, impermissible. For example, a luminosity cannot be set excessively light or dark and/or a volume cannot be set excessively quiet or loud.

Furthermore, the monitoring unit can prevent a setting of an impermissible parameter. In addition, in this case the monitoring unit can set a permissible parameter, e.g., a predetermined standard parameter.

This advantageously has the result that driving safety may be ensured even in the event of a change of parameters of the vehicle functions.

Furthermore, a device for setting at least one parameter of at least one light source and at least one parameter of one audio source is proposed, wherein the light source and the audio source may be arranged in a vehicle. The above-explained methods may be executable by means of the device. The device can comprise, for example, an operating element, in particular a touchscreen, a head unit, or a haptic operating element for this purpose. Furthermore, the device can comprise at least one selection element. Furthermore, the device can comprise at least one setting unit, wherein by means of the setting unit, at least one parameter of the at least one light source and/or at least one parameter of the at least one audio source may be settable in a user-specific manner. Furthermore, the device can comprise at least one configuration element, wherein the baby sleep profile may be configurable by means of the configuration element. Furthermore, the device can also comprise the at least one light source and the at least one audio source.

Disclosed embodiments will be explained in greater detail on the basis of an exemplary embodiment. FIG. 1 shows a schematic block diagram of a device for setting at least one parameter of a light source and at least one parameter of an audio source.

In this case, a device 1 comprises a head unit 2, which may be used as a display and operating unit. The head unit 2 has a soft key 3, wherein a baby sleep profile may be activated upon actuation of the soft key 3. Furthermore, the device 1 comprises a control unit (not shown) of the head unit 2 and a memory unit (also not shown). Furthermore, a control unit 4a of a light source in a vehicle roof lining and a control unit 4b for a light source of a foot well light are shown. These may be assigned to a functional area of light sources 4. Furthermore, a control unit 5a of an audio source of a driver assistance system, a control unit 5b of an audio source of a driver information system, and a control unit 5c of an audio source of an infotainment system are shown. These may be assigned to a functional area of audio sources 5. The control units 4a, 4b, 5a, 5b, 5c may be connected in this case to the control unit of the head unit 2 and the memory unit via a bus system (also not shown). A vehicle driver (not shown) can select and activate the baby sleep profile by activating the soft key 3. The control unit of the head unit 2 detects the selection and activation of the baby sleep profile and communicates this by data technology to the memory unit and the control units 4a, 4b, 5a, 5b, 5c. The memory unit then transmits the parameters of the light sources and audio sources via the bus system to the control units 4a, 4b, 5a, 5b, 5c. These control units accept the transmitted parameters and subsequently execute the lighting and audio functions parameterized using the transmitted parameters.

For example, upon operation of the soft key 3, a parameter setting can be set according to at least one of the following functionalities:
dimming an internal light upon opening of a door,
reducing a volume of warning sounds or instructions of a driver assistance system, in particular in the rear region of the vehicle,
activating a "silent navigation" in the navigation system,
deactivating the volume increase in the event of traffic announcements on the radio,
darkening the windowpanes (e.g., by sun roller blinds) to keep out flickering external light.

LIST OF REFERENCE NUMERALS

1 device for setting at least one parameter of at least one light source
2 head unit
3 soft key
4a control unit
4b control unit
4 functional area of light sources
5a control unit
5b control unit
5c control unit
5 functional area of audio sources

The invention claimed is:

1. A method for setting at least one function parameter of at least one light source and at least one function parameter of at least one audio source, wherein the at least one light source and at least one audio source are arranged in a vehicle, the method comprising:
   receiving an indication of an activation of a first function profile specifying the at least one function parameter of the at least one light source and the at least one function parameter of the at least one audio source, wherein
      the first function profile is a group-specific profile that specifies parameters as a function of a group of users;
   activating the first function profile including setting functionality of the at least one light source based on the at least one function parameter of the at least one light source and setting functionality of the at least one audio source based on the at least one function parameter of the at least one audio source,
   wherein the setting of the functionality of the at least one light source and the setting of functionality of at least one audio source comprise, respectively, setting functionality of all light sources which are assigned to a functional area of light sources corresponding to a functional area of the first function profile, and setting functionality of all audio sources which are assigned to a functional area of audio sources corresponding to the functional area of the first function profile, while
   ensuring that light and audio sources exist whose parameters are not to be changed by the activation of the first function profile.

2. The method of claim 1, wherein the first function profile is activated using an operating element.

3. The method of claim 1, wherein the indication of the first function profile is received by receiving an indication of a selection of one of at least two function profiles.

4. The method of claim 3, wherein the selection and activation of an appropriate first function profile increases driving safety as a result of better adaptation of the parameters to a driving situation or to the user for multiple driving situations or user groups.

5. The method of claim 1, further comprising, after an activation of the first function profile, altering all or selected parameters of the light sources and/or the audio sources included in the functional area for the first function profile based on user input.

6. The method of claim 1, wherein the at least the first function profile is configurable.

7. The method of claim 1, further comprising permitting the activation of the first function profile in response to a determination that the vehicle is traveling at a permissible velocity for the first function profile.

8. The method of claim 1, further comprising:
monitoring the parameters of the at least one light source and the parameters of the at least one audio source; and
preventing the parameters of the at least one light source and the parameters of the at least one audio source from falling outside a predetermined safety interval.

9. The method of claim 1, wherein the at least one light source includes changeable parameters and unchangeable parameters and the at least one audio source includes changeable parameters and unchangeable parameters, the method further comprising:
changing only the changeable parameters of the at least one light source and the changeable parameters of the at least one audio source in response to activating the first function profile.

10. A device for setting at least one parameter of at least one light source and setting at least one parameter of a least one audio source, the device comprising:
at least one operating element that is configured to enable activation of at least one first function profile, wherein the first function profile is a group-specific profile that specifies parameters as a function of a group of users,
wherein at least one function parameter of the at least one light source and at least one function parameter of at least one audio source are settable by use of the at least one operating element to activate the first function profile,
wherein activating the first function profile includes setting functionality of the at least one light source based on the at least one function parameter of the at least one light source and setting functionality of the at least one audio source based on the at least one function parameter of the least one audio source,
wherein the at least one light source and the at least one audio source are arranged in a vehicle,
wherein the setting of the functionality of the at least one light source and the setting of functionality of at least one audio source comprise, respectively, setting functionality of all light sources which are assigned to a functional area of light sources corresponding to a functional area of the first function profile, and setting functionality of all audio sources which are assigned to a functional area of audio sources corresponding to the functional area of the first function profile, while ensuring that light and audio sources exist whose parameters are not to be changed by the activation of the first function profile.

11. The device of claim 10, wherein the device further comprises at least one selection element, wherein the at least the first function profile is selectable from at least two function profiles using the selection element.

12. The device of claim 11, wherein the selection and activation of an appropriate first function profile increases driving safety as a result of better adaption of the parameters to a driving situation or to the user for multiple driving situations or user groups.

13. The device of claim 10, further comprising at least one setting element, wherein all or selected parameters of the light sources and/or the audio sources included in the functional area for the first functional profile are settable based on user input after an activation of the first function profile.

14. The device of claim 10, further comprising at least one configuration element, wherein at least the first function profile is configurable using the configuration element.

15. The device of claim 10, wherein the at least one operating element is configured to enable activation of the first function profile only in response to a determination that the vehicle is traveling at a permissible velocity for the first function profile.

16. The device of claim 10, wherein the device is configured to monitor the parameters of the at least one light source and the parameters of the at least one audio source and prevent the parameters of the at least one light source and the parameters of the at least one audio source from falling outside a predetermined safety interval.

17. The device of claim 10, wherein
the at least one light source includes changeable parameters and unchangeable parameters and the at least one audio source includes changeable parameters and unchangeable parameters, and
only the changeable parameters of the at least one light source and the changeable parameters of the at least one audio source can be changed in response to activating the first function profile.

* * * * *